United States Patent
Yu et al.

(10) Patent No.: US 10,481,712 B2
(45) Date of Patent: Nov. 19, 2019

(54) TOUCH LIQUID CRYSTAL PANEL AND LIQUID CRYSTAL DISPLAY

(71) Applicant: Wuhan China Star Optoelectronics Technology Co., Ltd., Wuhan, Hubei (CN)

(72) Inventors: Yun Yu, Guangdong (CN); Qipei Zhang, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 45 days.

(21) Appl. No.: 15/367,067

(22) Filed: Dec. 1, 2016

(65) Prior Publication Data
US 2018/0011573 A1 Jan. 11, 2018

(30) Foreign Application Priority Data
Jul. 8, 2016 (CN) .......................... 2016 1 0537119

(51) Int. Cl.
| G06F 3/041 | (2006.01) |
| G06F 3/044 | (2006.01) |
| G02F 1/1333 | (2006.01) |
| G02F 1/1335 | (2006.01) |

(Continued)

(52) U.S. Cl.
CPC ........ *G06F 3/0412* (2013.01); *G02F 1/13338* (2013.01); *G02F 1/13394* (2013.01); *G02F 1/133345* (2013.01); *G02F 1/133512* (2013.01); *G02F 1/133514* (2013.01); *G02F 1/134309* (2013.01); *G06F 3/044* (2013.01); *G06F 3/0416* (2013.01); *G02F 2001/13396* (2013.01); *G02F 2001/13398* (2013.01)

(58) Field of Classification Search
USPC .......................................................... 349/12
See application file for complete search history.

(56) References Cited

U.S. PATENT DOCUMENTS

| 2007/0097278 A1* | 5/2007 | Rho ..................... G02F 1/13338 349/12 |
| 2013/0021552 A1* | 1/2013 | Tomioka ............. G02F 1/13392 349/43 |
| 2014/0071391 A1* | 3/2014 | Yang ................. G02F 1/133371 349/138 |

FOREIGN PATENT DOCUMENTS

| CN | 101452158 A | 6/2009 |
| CN | 101833188 A | 9/2010 |
| CN | 103869548 A | 6/2014 |

(Continued)

*Primary Examiner* — Georgia Y Epps
*Assistant Examiner* — Jacob R Stern
(74) *Attorney, Agent, or Firm* — Andrew C. Cheng

(57) ABSTRACT

A touch liquid crystal panel includes an array substrate and a color filter substrate disposed opposite, mutually insulated self-capacitance electrodes and electrode leads are disposed on the array substrate, the electrode leads are covered by a second insulating layer. A main post spacer and a sub post spacer are disposed between the array substrate and the color filter substrate. A first end of the main post spacer is connected to the color filter substrate, a second end extends towards the array substrate and opposite to a first electrode lead, a position of the first electrode lead corresponding to the second end of the main post spacer is etched to form an avoidance zone, the second end of the main post spacer is contacted with the second insulating layer in the avoidance zone. A first end of the sub post spacer is connected to the color filter substrate.

18 Claims, 4 Drawing Sheets

(51) Int. Cl.
 *G02F 1/1339* (2006.01)
 *G02F 1/1343* (2006.01)

(56) References Cited

FOREIGN PATENT DOCUMENTS

| | | |
|---|---|---|
| CN | 103913896 A | 7/2014 |
| CN | 105404040 A | 3/2016 |
| CN | 105511186 A | 4/2016 |
| KR | 20060066271 A | 6/2006 |
| KR | 20070035270 A | 7/2007 |
| TW | 201411252 A | 3/2014 |

\* cited by examiner

TOUCH LIQUID CRYSTAL PANEL AND LIQUID CRYSTAL DISPLAY

TECHNICAL FIELD

The disclosure relates to a liquid crystal display technical field, and more particularly to a touch liquid crystal panel and a liquid crystal display including the touch liquid crystal panel.

DESCRIPTION OF RELATED ART

A liquid crystal display has features such as small volume, low energy consumption and relatively low costs without radiation, which dominates the current flat panel display market, the liquid crystal display is widely applied in various electric devices, such as a mobile phone, a laptop, etc. As the spread of the liquid crystal displays, the liquid crystal display technology is more mature, focus of a customer turns from the technology to pretty appearance, such as a case color of a mobile phone affects bias of a customer.

The liquid crystal display (LCD) is widely applied due to advantages such as a thin body, low power consumption without radiation. The liquid crystal displays available on the market are mostly backlight liquid crystal displays, including a liquid crystal display panel and a backlight module. The liquid crystal display panel is commonly formed by a color filter (CF) substrate, a thin film transistor array substrate, a liquid crystal layer and a sealed frame between the color filter substrate and the thin film transistor substrate. A liquid crystal layer thickness, or a cell gap, is mainly controlled by a height of a post spacer (PS) disposed between the array substrate and the color filter substrate, the liquid crystal layer thickness has significant influence on a structural parameter and display quality of the liquid crystal display.

A conventional post spacer is generally formed on a black matrix of the color filter substrate by a process such as mask, photoetching, etc. After the color filter substrate and the thin film transistor array substrate are aligned, the post spacer is supported on a flat layer of the array substrate, the post spacer between the color filter substrate and the array substrate supports and buffers the previous two substrates, so as to maintain the predetermined cell gap and the stability of an image displayed. At present, in the liquid crystal display panel, more than two types of post spacers are generally employed, such as a main PS and a sub PS disposed on the color filter substrate play a role of multi-level buffer, so as to prevent occurrence of various Mura or errors. A height of the main PS is more than a height of the sub PS, the amount of the sub PSs is more than the amount of the main PSs, the two need to be formed by different processes. When the liquid crystal panel is aligned, the main PS will be compressed to some extent, supporting the cell gap, and keeping compressed, and the sub PS will not be compressed. When the liquid crystal panel is loaded on too much force, the sub PS will be compressed, playing a role of assisting support.

As the rapid development of display technology, a touch screen panel gradually pervades human life, touch structures included by the touch screen panel can be classified in a mutual capacitance touch structure and a self-capacitance touch structure. The self-capacitance touch structure is preferred by panel manufacturers due to the accuracy of touch sensing and relatively high noise-signal ratio. At present, the self-capacitance touch structure detects a finger touch position utilizing the principle of self-capacitance, specifically is disposing self-capacitance electrodes separately on a layer in the touch structure, each of the self-capacitance electrodes needs to connect with a touch detection chip by an individual outgoing line, when a human body does not touch the screen, capacitance bore by each of the self-capacitance electrodes is a constant, when the human body touches the screen, the capacitance bore by the self-capacitance electrode corresponding to the touch position is a fixed value plus body capacitance, the touch detection chip can determine the touch position by detecting variation of capacitance of each of the self-capacitance electrodes during the touch period.

As a structural schematic view of a touch liquid crystal panel according to the prior art shown in FIG. 1, the touch liquid crystal panel includes an array substrate 1 and a color filter substrate 2 disposed opposite, the array substrate 1 and the color filter substrate 2 are separated by a main PS 3a and a sub PS 3b. A common electrode layer 4 and a dielectric layer 5 are disposed on the array substrate 1 in sequence, the common electrode layer 4 is divided into multiple insulated self-capacitance electrodes 4a, electrode leads 6 are disposed on the dielectric layer 5, the electrode leads 6 and the self-capacitance electrodes 4a are connected respectively and electrically, each of the self-capacitance electrodes 4a is connected to an external touch detection chip (not shown in the figure), an insulating protection layer 7 covers the electrode leads 6. One end of the main PS 3a and that of the sub PS 3b are securely connected to a black matrix 8 of the color filter substrate 2, the other ends are opposite to the electrode leads 6 on the array substrate 1 respectively, the other end of the main PS 3a presses on a convex position of the insulating protection layer 7 corresponding to the electrode lead 6, as the height of the sub PS 3b is less than the height of the main PS 3a (a length extending from the color filter substrate 2 towards the array substrate 1), the other end of the sub PS 3b is above the corresponding electrode lead 6 and suspending.

In the touch liquid crystal panel with the structure above, the main PS 3a needs to contact with a convex position on the corresponding electrode lead 6, a width of the electrode leads 6 is generally small, the main PS 3a can be dislocated easily and fall from the convex position, which fails to maintain an even and stable liquid crystal cell gap.

SUMMARY

Accordingly, the disclosure provides a touch liquid crystal panel, a post spacer therein can be supported stably, so as to evenly and stably maintain the liquid crystal cell gap.

In order to chase the objective above, the disclosure is as follows.

A touch liquid crystal panel includes an array substrate and a color filter substrate disposed opposite, a plurality of mutually insulated self-capacitance electrodes are disposed on the array substrate, the self-capacitance electrodes are covered by a first insulating layer, a plurality of electrode leads are disposed on the first insulating layer, the plurality of electrode leads and the plurality of self-capacitance electrodes are connected respectively and electrically. The electrode leads are further covered by a second insulating layer. The electrode leads include a first electrode lead and a second electrode lead. A main post spacer and a sub post spacer are disposed between the array substrate and the color filter substrate. A first end of the main post spacer is connected to the color filter substrate, a second end of the main post spacer extends towards the array substrate and opposite to the first electrode lead, a position of the first electrode lead corresponding to the second end of the main post spacer is etched to form an avoidance zone, the second end of the main post spacer is contacted with the second insulating layer in the avoidance zone. A first end of the sub post spacer is connected to the color filter substrate, a second end of the sub post spacer extends towards the array substrate and opposite to the second electrode lead, the second end of the sub post spacer suspends above the second insulating layer.

A black matrix is disposed on the color filter substrate, the main post spacer and the sub post spacer are formed on the black matrix.

Color photo resistors are further disposed on the color filter substrate, the color photo resistors include a red photo resistor, a green photo resistor and a blue photo resistor, the red photo resistor, the green photo resistor and the blue photo resistor are separated mutually by the black matrix.

The electrode leads on the array substrate are disposed opposite to the black matrix.

The plurality of mutually insulated self-capacitance electrodes are distributed as an array, the electrode leads and the corresponding self-capacitance electrode are connected electrically through a via hole defined in the first insulating layer.

Cross-sections of the main post spacer and the sub post spacer are round or square.

A cross-sectional area of the first end is larger than a cross-sectional area of the second end of the main post spacer. A cross-sectional area of the first end is larger than a cross-sectional area of the second end of the sub post spacer.

The touch liquid crystal panel further includes a liquid crystal layer, disposed between the array substrate and the color filter substrate.

The plurality of mutually insulated self-capacitance electrodes are further deployed as common electrodes, the self-capacitance electrodes are configured to transfer common voltages and touch signals in a timeshare mode within a period displaying a frame of image.

The disclosure further provides a liquid crystal display, including a liquid crystal panel and a backlight module, the liquid crystal panel and the backlight module are disposed opposite, the backlight module provides light to the liquid crystal panel, so that the liquid crystal panel displays an image, the liquid crystal panel is the touch liquid crystal panel mentioned above.

According to the touch liquid crystal panel provided by embodiments of the disclosure, in the array substrate, the main post spacer and the sub post spacer are both above the electrode leads correspondingly, and in the electrode lead corresponding to the main post spacer, the avoidance zone is formed by digging, the main post spacer is contacted with the second insulating layer in the avoidance zone, the position of the avoidance zone is successive and flat, therefore, the main post spacer will not dislocate and further fall from the convex position, which can maintain the liquid crystal cell gap evenly and stably.

DETAILED DESCRIPTION OF PREFERRED EMBODIMENTS

In order to clarify objectives and advantages of the disclosure, embodiments of the disclosure will be described in detail with reference to the accompanying drawings as follows. The preferred embodiments are illustrated in the figures. The figures and embodiments described according to the figures are merely exemplary, and the disclosure is not limited by the embodiments.

In order to prevent unnecessary details from blurring the disclosure, only structures and/or processes related tightly to the disclosure are shown in the figures, other details that are not highly correlated to the disclosure will be omitted.

Figure 1:
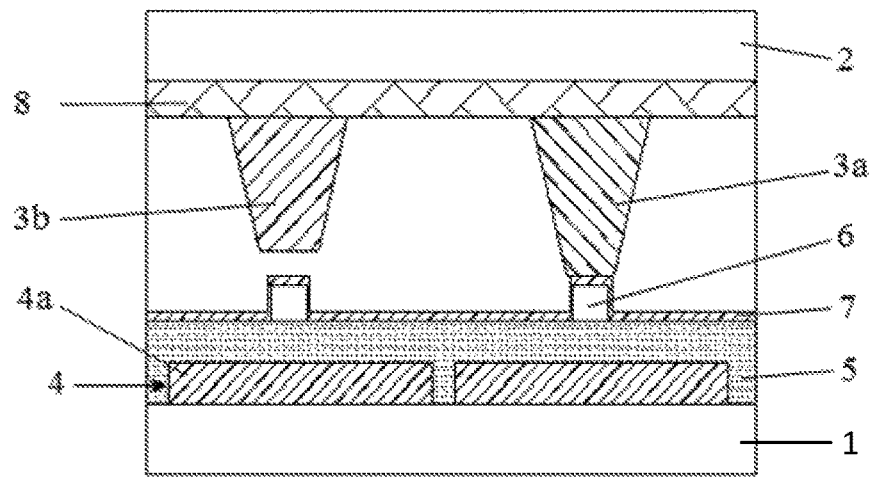
FIG. 1 is a structural schematic view of a touch liquid crystal panel according to the prior art.
Figure 2:
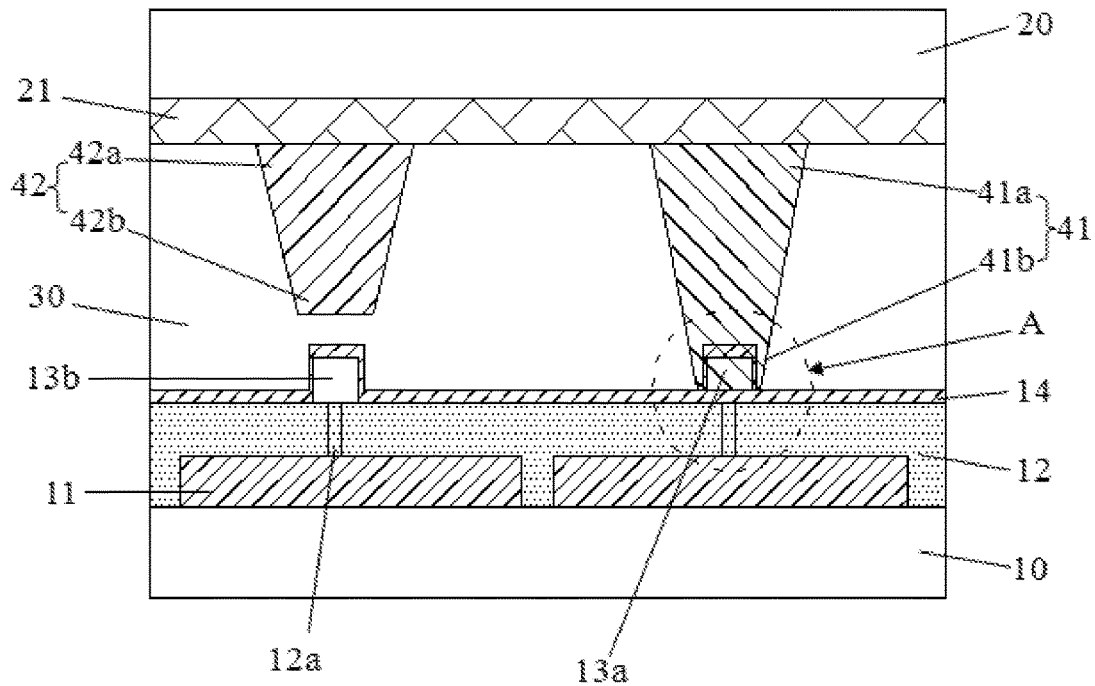
FIG. 2 is a structural schematic view of a touch liquid crystal panel according to an embodiment of the disclosure.

Referring to FIG. 2, the embodiment provides a touch liquid crystal panel, the touch liquid crystal panel includes an array substrate 10 and a color filter substrate 20 disposed opposite, further includes a liquid crystal layer 30 between the array substrate 10 and the color filter substrate 20.

Figure 5:
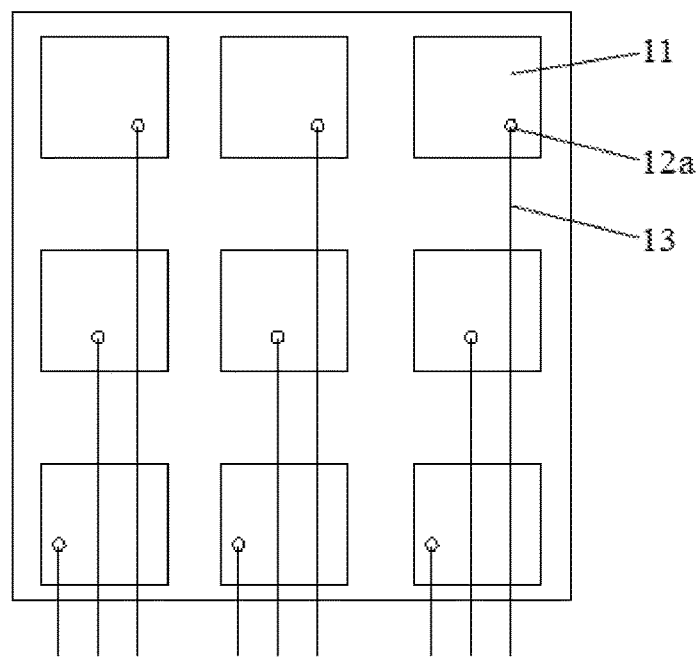
FIG. 5 is a distribution view of self-capacitance electrodes according to an embodiment of the disclosure.

As shown in FIG. 2, a plurality of mutually insulated self-capacitance electrodes 11 are disposed on the array substrate 10 (the figure only shows two exemplarily), the self-capacitance electrodes 11 are covered by a first insulating layer 12, a plurality of electrode leads including a first electrode lead 13a and a second electrode lead 13b are disposed on the first insulating layer 12, the plurality of electrode leads 13a, 13b and the plurality of self-capacitance electrodes 11 are connected respectively and electrically. The electrode leads 13a, 13b are further covered by a second insulating layer 14. Specifically, referring to FIG. 2 and FIG. 5, the plurality of mutually insulated self-capacitance electrodes 11 are distributed as an array, the electrode leads 13a, 13b and the corresponding self-capacitance electrodes 11 are connected electrically through a via hole 12a defined in the first insulating layer 12 (only partial self-capacitance electrodes are shown in FIG. 5 exemplarily, and the first insulating layer 12 is not shown in FIG. 5). In the embodiment, the plurality of mutually insulated self-capacitance electrodes 11 are further deployed as common electrodes, the self-capacitance electrodes 11 are configured to transfer common voltages and touch signals in a timeshare mode within a period displaying a frame of image.

Figure 3:
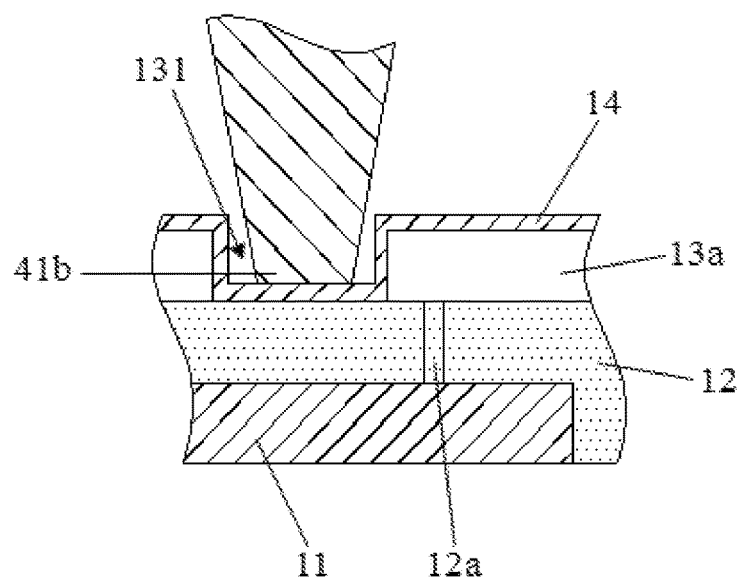
FIG. 3 is a cross-sectional schematic view of part A in FIG. 2 taken along a direction perpendicular to the visual plane.
Figure 4:
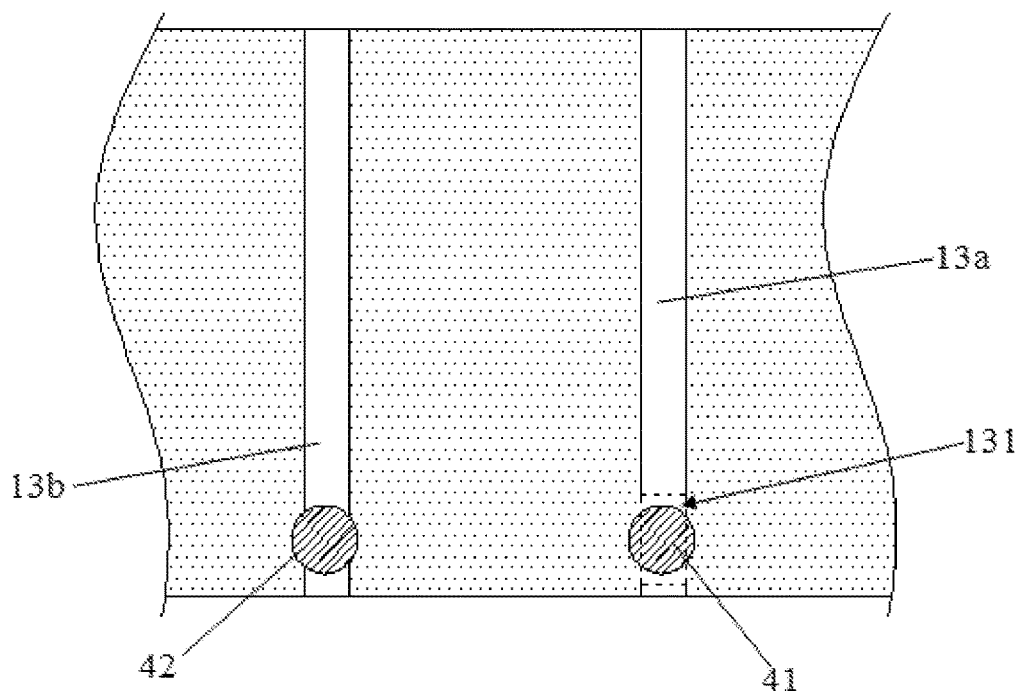
FIG. 4 is a structural schematic view of electrode leads according to an embodiment of the disclosure.

Referring to FIG. 2, FIG. 3 and FIG. 4, a main post spacer 41 and a sub post spacer 42 with different heights are further disposed between the array substrate 10 and the color filter substrate 20. A first end 41a of the main post spacer 41 is connected to the color filter substrate 20, a second end 41b of the main post spacer 41 extends towards the array substrate 10 and opposite to the first electrode lead 13a, a position of the first electrode lead 13a corresponding to the second end 41b of the main post spacer 41 is etched to form an avoidance zone 131, the second end 41b of the main post spacer 41 is contacted with the second insulating layer 14 in the avoidance zone 131. A first end 42a of the sub post spacer 42 is connected to the color filter substrate 20, a second end 42b of the sub post spacer 42 extends towards the array substrate 10 and opposite to the second electrode lead 13b, the second end 42b of the sub post spacer 42 suspends above the second insulating layer 14. It needs to be illustrated that the first electrode lead 13a shown in FIG. 2 is located in the main post spacer 41, which is mainly for showing the first electrode lead 13a is behind the main post spacer 41, form the visual angle of a front view in FIG. 2, the first electrode lead 13a should be sheltered by the main post spacer 41. Moreover, FIG. 3 is a cross-sectional schematic view of part A in FIG. 2 taken along a direction perpendicular to the visual plane, which is the cross-sectional schematic view of part A taken along a direction of the page.

Figure 6:
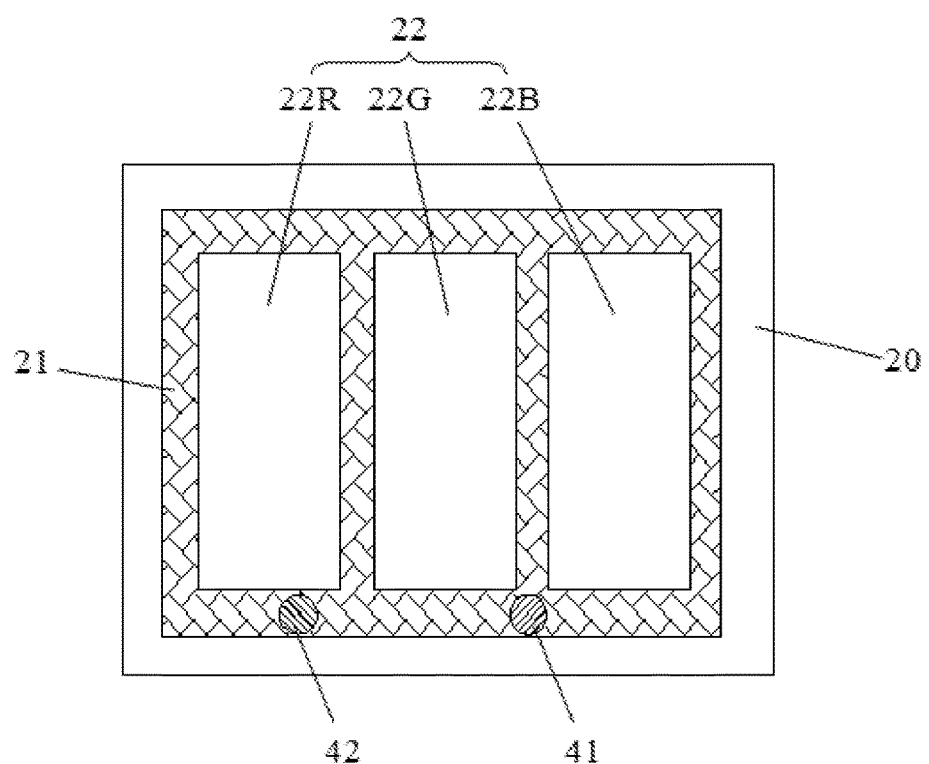
FIG. 6 is a flat structural schematic view of a color filter substrate according to an embodiment of the disclosure.

With regard to the main post spacer 41 and the sub post spacer 42, to be more specific, as shown in FIG. 6, a black matrix 21 and color photo resistors 22 are disposed on the color filter substrate, the color photo resistors include a red photo resistor 22R, a green photo resistor 22G and a blue photo resistor 22B, the red photo resistor 22R, the green photo resistor 22G and the blue photo resistor 22B are separated mutually by the black matrix 21, the main post spacer 41 and the sub post spacer 42 are formed on the black matrix 21. Each pixel element includes one red photo resistor 22R, one green photo resistor 22G and one blue photo resistor 22B, FIG. 6 shows one of them exemplarily.

As the touch liquid crystal panel provided above, on the array substrate 10, the main post spacer 41 and the sub post spacer 42 are both above the electrode leads 13a, 13b correspondingly, in the first electrode lead 13a corresponding to the main post spacer 41, the avoidance zone 131 is formed by etching, the main post spacer 41 is contacted with the second insulating layer 14 in the avoidance zone 131, the position of the avoidance zone 131 is successive and flat (the avoidance zone 131 and the second insulating layer 14 on two sides of the first electrode lead 13a are successive and flat), therefore, the main post spacer 41 will not dislocate and further fall from the convex position, which can maintain the liquid crystal cell gap evenly and stably.

Referring to FIG. 5, the plurality of mutually insulated self-capacitance electrodes 11 are further deployed as common electrodes, or a common electrode layer is divided into the plurality of mutually insulated self-capacitance electrodes 11, a size of each of the self-capacitance electrodes 11 can correspond to one pixel element or multiple pixel elements. Which is when the common electrode layer is divided into smaller amount of the self-capacitance electrodes 11, an area of one self-capacitance electrode 11 is larger, which can correspond to multiple pixel elements. When the common electrode layer is divided into larger amount of self-capacitance electrodes 11, the area of one self-capacitance electrode 11 is smaller, which can merely correspond to one pixel element. However, no matter how many mutually insulated self-capacitance electrodes 11 are divided from the common electrode layer, the electrode leads 13a, 13b of the self-capacitance electrodes 11 both should be disposed opposite to the black matrix 21 on the color filter substrate 20.

The amount of the main post spacers 41 and the sub post spacers 42 needs to be determined according to the area of the liquid crystal panel, generally, the amount of the sub post spacers 42 is more than that of the main post spacers 41. The main post spacers 41 and the sub post spacers 42 can be separated by several pixel elements, so that the electrode leads 13a, 13b are not corresponding to the amount of the main post spacers 41, however, the electrode leads 13a, 13b should be disposed below the positions disposing the main post spacer 41 and the sub post spacer 42, but the positions above where the electrode leads 13a, 13b are disposed can dispose with the main post spacer 41 and the sub post spacer 42 or not. As the position of the first electrode lead 13a corresponding to the main post spacer 41 is etched to form the avoidance zone 131, signal transformation will be affected slightly, in order to reduce the influence on signals to the minimum, distribution of the main post spacers 41 should avoid key zones arranged with the electrode leads 13a, 13b.

Figure 7:
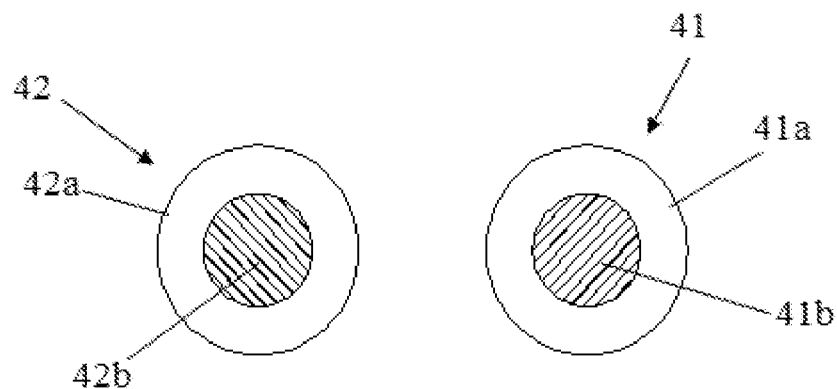
FIG. 7 is a bottom view of a main post spacer and a sub post spacer according to an embodiment of the disclosure.

In the embodiment, as shown in FIG. 7, cross-sections of the main post spacer 41 and the sub post spacer 42 are round. A cross-sectional area of the first end 41a is larger than a cross-sectional area of the second end 41b of the main post spacer 41, a cross-sectional area of the first end 42a is larger than a cross-sectional area of the second end 42b of the sub post spacer 42, that is, a diameter of the first end 41a is larger than a diameter of the second end 41b of the main post spacer 41, a diameter of the first end 42a is larger than a diameter of the second end 42b of the sub post spacer 42. In other embodiments, the cross-sections of the main post spacer 41 and the sub post spacer 42 can also be square, moreover, the cross-sectional area of the first end 41a is further set to be larger than the cross-sectional area of the second end 41b of the main post spacer 41, the cross-sectional area of the first end 42a is further set to be larger than the cross-sectional area of the second end 42b of the sub post spacer 42, that is, a side length of the first end 41a is larger than a side length of the second end 41b of the main post spacer 41, a side length of the first end 42a is larger than a side length of the second end 42b of the sub post spacer 42.

Figure 8:
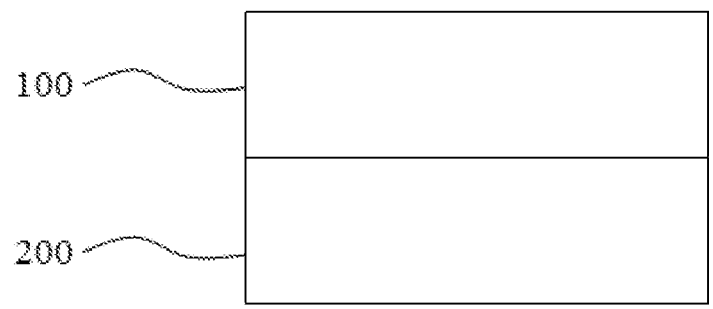
FIG. 8 is a structural frame view of a liquid crystal display according to an embodiment of the disclosure.

The embodiment provides a liquid crystal display, as shown in FIG. 8, the liquid crystal display includes a touch liquid crystal panel 100 provided by the embodiments of the disclosure and a backlight module 200, the liquid crystal panel 100 and the backlight module 200 are disposed opposite, the backlight module 200 provides light to the liquid crystal panel 100, so that the liquid crystal panel 100 displays an image.

Overall, according to the touch liquid crystal panel provided by the embodiments of the disclosure, on the array substrate, the main post spacer and the sub post spacer are both above the electrode leads correspondingly, in the electrode lead corresponding to the main post spacer, the avoidance zone is formed by digging, the main post spacer is contacted with the second insulating layer in the avoidance zone, the position of the avoidance zone is successive and flat, therefore, the main post spacer will not dislocate and further fall from the convex position, which can maintain the liquid crystal cell gap evenly and stably.

It needs to be illustrated that, in the disclosure, relational terms such as first and second are merely for distinguishing one object or process from another, rather than requiring or implying any practical relationship or order exists between the objects or processes. Moreover, a term "comprise", "include" or any other modification indicates non-exclusive containing, so that a process, a method, an object or a device including a series of elements not only contains the elements, but also other elements that are not listed explicitly, or further including inherent elements of the process, method, object or device. Without further limitation, an element restricted by a sentence "include a . . . " does not exclude other identical elements existing in the process, method, object or device including the elements.

Above are merely embodiments of the disclosure, improvement and modification obtained by a person skilled in the art according to the principle of the application should be covered by the protected scope of the disclosure.

What is claimed is:

1. A touch liquid crystal panel, comprising an array substrate and a color filter substrate disposed opposite,
   a plurality of mutually insulated self-capacitance electrodes disposed on the array substrate, the self-capacitance electrodes covered by a first insulating layer, a plurality of electrode leads disposed on the first insulating layer, the plurality of electrode leads and the plurality of self-capacitance electrodes connected respectively and electrically; the electrode leads further covered by a second insulating layer; the electrode leads comprising a first electrode lead and a second electrode lead; and
   a main post spacer and a sub post spacer disposed between the array substrate and the color filter substrate; a height of the main post spacer is greater than a height of the sub post spacer; a first end of the main post spacer connected to the color filter substrate, a second end of the main post spacer extending towards the array substrate and opposite to the first electrode lead, a position of the first electrode lead corresponding to the second end of the main post spacer etched to form an avoidance zone, a surface of the second insulating layer is concaved toward the first insulating layer, the second end of the main post spacer is contacted with the concaved surface of the second insulating layer in the avoidance zone such that when the second end of the main post spacer is contacted with the concaved surface of the second insulating layer in the avoidance zone, a first end of the sub post spacer is connected to the color filter substrate, a second end of the sub post spacer extends towards the array substrate and is opposite to the second electrode lead, and the second end of the sub post spacer suspends above and is separated from the second insulating layer.

2. The touch liquid crystal panel according to claim 1, wherein a black matrix is disposed on the color filter substrate, the main post spacer and the sub post spacer are formed on the black matrix.

3. The touch liquid crystal panel according to claim 2, wherein color photo resistors are further disposed on the color filter substrate, the color photo resistors comprise a red photo resistor, a green photo resistor and a blue photo resistor, the red photo resistor, the green photo resistor and the blue photo resistor are separated mutually by the black matrix.

4. The touch liquid crystal panel according to claim 2, wherein the electrode leads on the array substrate are disposed opposite to the black matrix.

5. The touch liquid crystal panel according to claim 4, wherein the plurality of mutually insulated self-capacitance electrodes are distributed as an array, the electrode leads and the corresponding self-capacitance electrodes are connected electrically through a via hole defined in the first insulating layer.

6. The touch liquid crystal panel according to claim 1, wherein cross-sections of the main post spacer and the sub post spacer are round or square.

7. The touch liquid crystal panel according to claim 6, wherein a cross-sectional area of the first end is larger than a cross-sectional area of the second end of the main post spacer; a cross-sectional area of the first end is larger than a cross-sectional area of the second end of the sub post spacer.

8. The touch liquid crystal panel according to claim 1, wherein the touch liquid crystal panel further comprises a liquid crystal layer, disposed between the array substrate and the color filter substrate.

9. The touch liquid crystal panel according to claim 1, wherein the plurality of mutually insulated self-capacitance electrodes are further deployed as common electrodes, the self-capacitance electrodes are configured to transfer common voltages and touch signals in a timeshare mode within a period displaying a frame of image.

10. A liquid crystal display, comprising a liquid crystal panel and a backlight module, the liquid crystal panel and the backlight module disposed opposite, the backlight module providing light to the liquid crystal panel, the liquid crystal panel displaying an image, the liquid crystal panel is a touch liquid crystal panel, the touch liquid crystal panel comprising an array substrate and a color filter substrate disposed opposite,
    a plurality of mutually insulated self-capacitance electrodes disposed on the array substrate, the self-capacitance electrodes covered by a first insulating layer, a plurality of electrode leads disposed on the first insulating layer, the plurality of electrode leads and the plurality of self-capacitance electrodes connected respectively and electrically; the electrode leads further covered by a second insulating layer; the electrode leads comprising a first electrode lead and a second electrode lead; and
    a main post spacer and a sub post spacer disposed between the array substrate and the color filter substrate; a height of the main post spacer is greater than a height of the sub post spacer; a first end of the main post spacer connected to the color filter substrate, a second end of the main post spacer extending towards the array substrate and opposite to the first electrode lead, a position of the first electrode lead corresponding to the second end of the main post spacer etched to form an avoidance zone, a surface of the second insulating layer is concaved toward the first insulating layer, the second end of the main post spacer is contacted with the concaved surface of the second insulating layer in the avoidance zone such that when the second end of the main post spacer is contacted with the concaved surface of the second insulating layer in the avoidance zone, a first end of the sub post spacer is connected to the color filter substrate, a second end of the sub post spacer extends towards the array substrate and is opposite to the second electrode lead, and the second end of the sub post spacer suspends above and is separated from the second insulating layer.

11. The liquid crystal display according to claim 10, wherein a black matrix is disposed on the color filter substrate, the main post spacer and the sub post spacer are formed on the black matrix.

12. The liquid crystal display according to claim 11, wherein color photo resistors are further disposed on the color filter substrate, the color photo resistors comprise a red photo resistor, a green photo resistor and a blue photo resistor, the red photo resistor, the green photo resistor and the blue photo resistor are separated mutually by the black matrix.

13. The liquid crystal display according to claim 11, wherein the electrode leads on the array substrate are disposed opposite to the black matrix.

14. The liquid crystal display according to claim 13, wherein the plurality of mutually insulated self-capacitance electrodes are distributed as an array, the electrode leads and the corresponding self-capacitance electrodes are connected electrically through a via hole defined in the first insulating layer.

15. The liquid crystal display according to claim 10, wherein cross-sections of the main post spacer and the sub post spacer are round or square.

16. The liquid crystal display according to claim 15, wherein a cross-sectional area of the first end is larger than a cross-sectional area of the second end of the main post spacer; a cross-sectional area of the first end is larger than a cross-sectional area of the second end of the sub post spacer.

17. The liquid crystal display according to claim 10, wherein the touch liquid crystal panel further comprises a liquid crystal layer, disposed between the array substrate and the color filter substrate.

18. The liquid crystal display according to claim 10, wherein the plurality of mutually insulated self-capacitance electrodes are further deployed as common electrodes, the self-capacitance electrodes are configured to transfer common voltages and touch signals in a timeshare mode within a period displaying a frame of image.

\* \* \* \* \*